June 8, 1926.

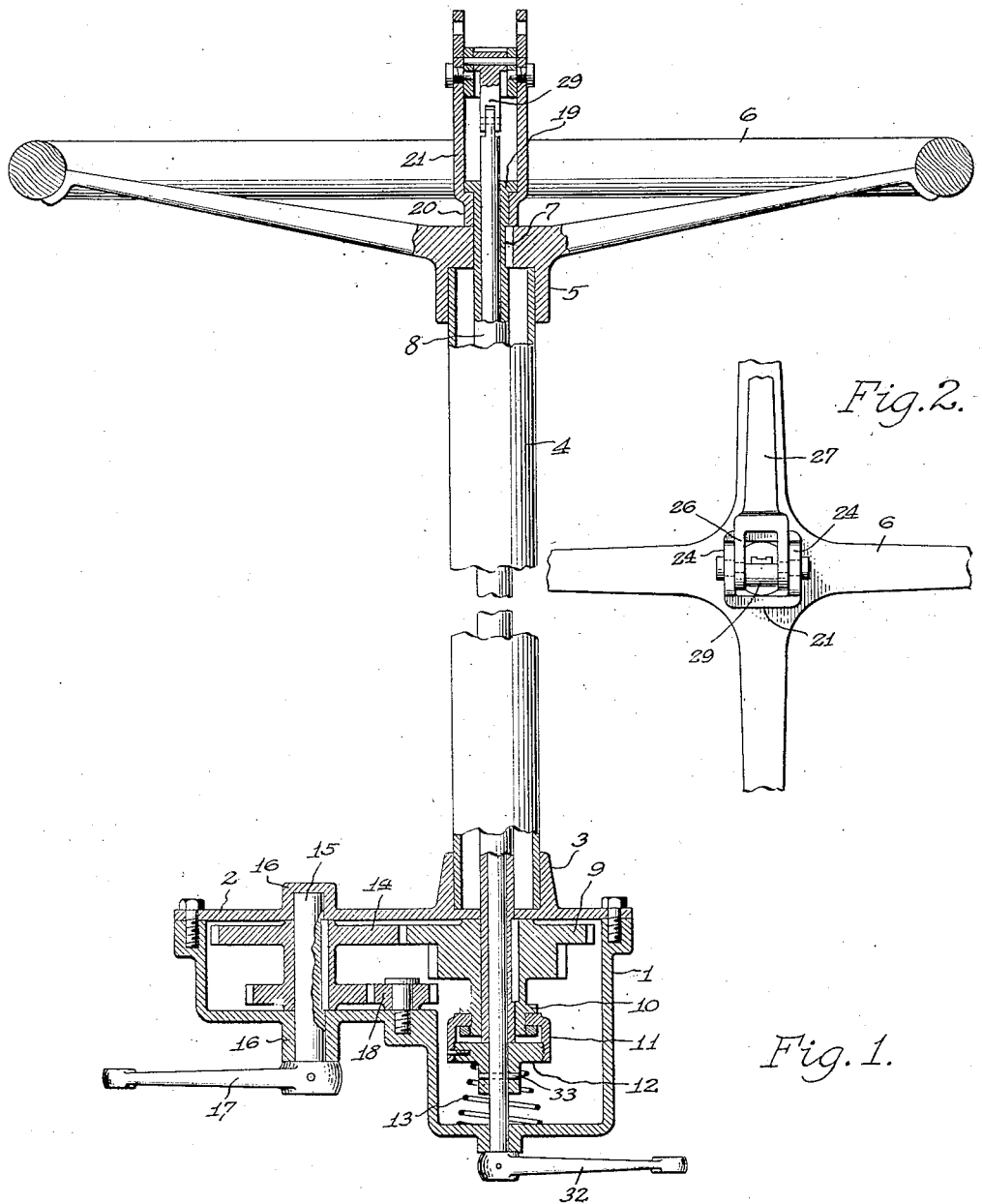

S. B. WINN

STEERING GEAR FOR DUPLEX TRACTORS

Filed Oct. 30, 1924  2 Sheets-Sheet 2

1,588,395

Inventor
Sidney B. Winn,

By
Attorneys

Patented June 8, 1926.

1,588,395

UNITED STATES PATENT OFFICE.

SIDNEY B. WINN, OF LAPEER, MICHIGAN.

STEERING GEAR FOR DUPLEX TRACTORS.

Application filed October 30, 1924. Serial No. 746,745.

This invention relates to a steering gear for vehicles and has special reference to a reversible steering gear that may be advantageously used in connection with tractors, industrial or other type of motor driven vehicles, which are very often backed or driven rearwardly. To obviate the necessity of a driver looking backwards from a driver's seat facing forward I provide a vehicle with confronting seats each of which may be occupied by a driver. Between the seats is the reversible steering gear arranged to be easily operated by a driver on either seat. Such an arrangement of seats and steering gear may be advantageously used in connection with duplex tractors or any vehicle having a double power plant or two or more individual power units.

The steering gear also includes means whereby the steering mechanism may be locked and associated with the steering gear is a means of controlling the use of the power plant or unit, whether the same be an internal combustion engine, electric motor or other type of power.

My invention will be hereinafter described and then claimed and reference will now be had to the drawings, wherein Figure 1 is a vertical sectional view of a steering column assembly, partly in elevation and partly broken away showing steering gears in position for driving in one direction;

Fig. 2 is a plan of the central portion or hub of a steering wheel;

Figure 3:
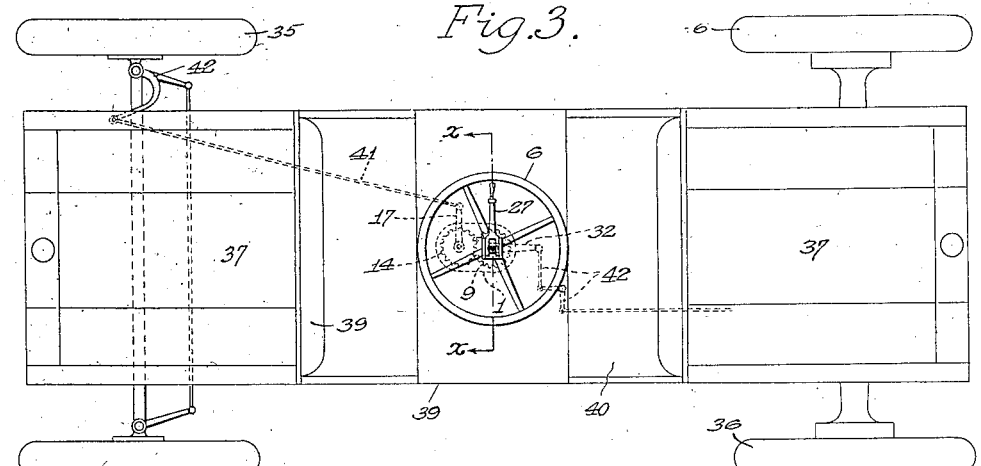
Fig. 3 is a diagrammatic view of a duplex tractor or vehicle provided with a steering gear.

In the drawings, the reference numeral 1 denotes a gear casing having a detachable cover 2 provided with a socket 3 for a tubular stationary steering column 4. Loosely mounted on the upper end of the column is the hub or spider portion 5 of a steering wheel 6, said wheel hub being keyed or otherwise fixed, as at 7, to a hollow shaft 8 extending through the column 4 into the casing 1.

On the lower end of the hollow shaft 8 is slidably keyed a compound gear wheel 9 provided with a collar or head 10 to which is loosely connected a coupling member 11 having a spring abutment 12 for an expansion spring 13 mounted in the bottom portion of the casing 1. The expansive force of the spring 13 supports the compound gear 9 normally elevated so that the large gear portion of the compound wheel may mesh with a compound steering gear 14 keyed or otherwise fixed on a crank shaft 15, journaled in bearings 16, carried by the casing 1 and its cover 2. The crank shaft 15 extends from the bottom of the casing 1 and is provided with a crank 17 adapted to be connected to the steering gear of a vehicle axle, as will hereinafter appear.

Rotatable on a lower wall of a casing 1 is an intermediate gear 18 constantly meshing with the compound steering gear 14 and adapted to be engaged by the compound sliding gear 9, when said gear is lowered or depressed to its fullest extent for reverse steering; it being obvious that the intermediate gear 18 permits of the steering shaft 15 being turned in a reverse direction when the sliding gear 9 meshes with the intermediate gear, compared to the steering direction attained by the compound gears 9 and 14 meshing with each other.

The upper end of the hollow shaft 8 is provided with a head or peripheral flange 19 and rotatable about the upper end of the hollow shaft, on the wheel hub 5, and under the hollow head 19, is the hub or sleeve portion 20 of a housing 21 substantially rectangular in cross section with two of its opposed walls cut away to provide shoulders 22 and 23 and its other opposed walls serving as bearings and locking lugs 24. Mounted in the bearing walls of the housing 21 are pintles 25 for the yoke or bifurcated end 26 of a lever 27, said lever being swingable from one side of the housing to the opposite side, it being shown in Fig. 4 as resting in the horizontal position on the shoulder 22 of the housing, and in Fig. 5 as having been swung to the opposite side of the housing to rest on the shoulder 23.

Figure 4:
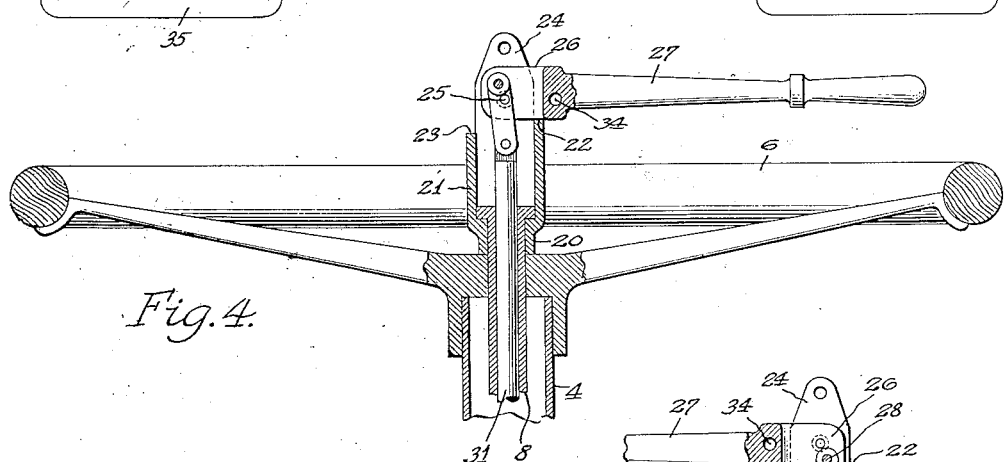
Fig. 4 is an enlarged cross sectional view of the steering wheel showing a control lever in position for driving in one direction.
Figure 5:
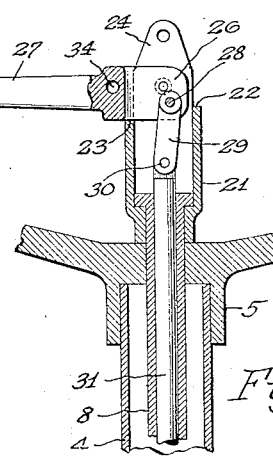
Fig. 5 is a similar view showing the control lever, in position for reverse driving.
Figure 6:
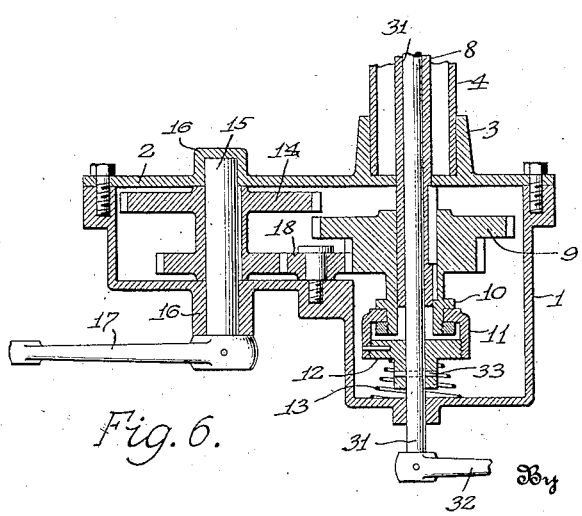
Fig. 6 is a vertical sectional view of the steering gears shifted for reverse drive.

Pivotally mounted in the yoke or bifurcated end 26 of the lever 27, by a pin 28 is the upper end of a link 29 which extends downwardly in the housing 21 and is pivotally connected, as at 30, to the upper end of a rod 31 extending through the hollow shaft 3 and through the bottom wall of the casing 1, said rod having a power control crank 32 on its lower end adapted to be articulated with the controller of a power plant of a vehicle. The spring abutment 12 of the coupling member 11 is attached to the rod 31 by a pin 33 or other means to permit of the rod 31 being used as a means of shifting the slide gear 9. This shifting is accomplished by simply swinging the lever 27 over the housing 21 from one side thereof to the other and such adjustment is maintained by locking, the pin 28 being off center, as best shown in Figs. 4 and 5. In either position of the lever the shoulders 22 and 23 serve as abutments and limit the expansive action of the spring 13, while the off-set condition of the pin 28 prevents accidental shifting of the sliding gear 9, by the spring 13, when in either steering position, as shown in Figs. 5 and 6.

There is an intermediate position for the sliding gear 9 so that said gear may mesh with the compound gear 14 and the intermediate gear 18. In such position the steering gear and controller crank is held against actuation and may be locked in such position by placing the lever 26 coaxial of the rod 31 and attaching it to the locking lugs 24 by a lock shackle or other securing means, the lever 27 having an opening 34 adapted to aline with the openings or apertures of the ears 24 and thus permit of a lock shackle being placed in such openings to lock the lever in an inactive vertical position.

Considering my steering gear in connection with a vehicle, I have outlined in Fig. 3, a vehicle having steering axle wheels 35 and driven wheels 36. The wheels 36 may be driven from one or more power plants 37 on the ends of the vehicle chassis 38 or by motors or other power units at the wheels 35 and 36. On the vehicle chassis 38 are confronting driver's seats 39 and 40 and the seat 40 may be considered as facing forward and the seat 39 rearward. The steering mechanism is supported by or from the chassis, between said seats, and the steering crank 17 is connected by a reach rod or drag link 41 to a conventional form of steering parts 42 associated with a front axle assembly of the vehicle. The crank 32 may be connected by linkage 42 to either or all power plants so that said power plants may be controlled by the lever 27. For instance, movement of the lever 27, when in a horizontal position at either side of the steering wheel, will control the application of power and such control of power is not interfered with by swinging the lever overhead from one side of the housing 21 to the opposite side, the linkage 42 permitting of such movement.

Considering Fig. 3, it will be noted that the driver may sit on the seat 40, facing the front axle assembly and conveniently manipulate the steering wheel 6 and control the power plant or plants by the right hand manipulating the lever 27. Under ordinary conditions, if the steering wheel 6 is turned in a clockwise direction the transmission gears at the base of the steering column will turn the axle wheels to the right, and in order that the driver may occupy the seat 39 and turn the steering wheel 6 in the usual direction to accomplish right steering, the shiftable gear of the transmission gears is changed by the lever 27 so that there will be a reverse steering action causing the axle wheels to be turned to the left by a counter clockwise rotation of the steering wheel 6. This is accomplished by merely shifting the lever 27 to the opposite side of the steering wheel 6 where it will be convenient for right hand manipulation. If the vehicle is to be driven rearwardly the driver may swing the lever 27 to the opposite side of the steering wheel 6, occupying the seat 39 and still use the right hand to manipulate the lever. Swinging the lever has not only placed it in position for convenient right hand use, but has changed the steering gears so that reverse steering may be accomplished by turning the steering wheel 6 in the usual direction. Since the lever 27 may be used to control the application of power said lever serves as a throttle and may be locked in a conspicuous inactive position to prevent the vehicle from being used by unauthorized persons.

It is noted that the casing 1 serves as a lubricant well and may be conveniently attached to the floor or chassis of a vehicle body.

What I claim is:—

1. In a steering gear mechanism wherein turning of a steering wheel in a clockwise direction turns steering wheels to the right; means for changing the turning of the steering wheels by the same clockwise turning of the steering wheel, said means including transmission gears, one of which gears is shiftable and coaxially of said steering wheel and means extending through said steering wheel and adapted for shifting said gear.

2. In steering gear mechanism wherein turning of a steering wheel in one direction turns steering wheels in one direction; means for changing the turning of the steering wheels relative to the steering wheel, said means including transmission gears, one of which is shiftable, means holding said shiftable gear normally in a defined relation to the other gears, and means coaxially of said shiftable gear adapted for shifting said gear, said last mentioned means being operatable through said shiftable gear and against the action of the first mentioned means.

3. A steering gear mechanism for the steering wheels of a vehicle having a power plant, said mechanism comprising a normally vertical steering column, transmission gears at the base of said column adapted for steering said steering wheels, one of said transmission gears being shiftable coaxially of said steering column to reverse the action of said transmission gears relative to said steering wheels, a steering wheel at the upper end of said steering column for operating said transmission gears, and means operatable through said steering wheel and column for shifting the shiftable gear of said transmission gears.

4. A steering gear mechanism for the steering wheels of a vehicle having a power plant, said mechanism comprising a steering column, transmission gears at the base of said column, adapted for steering said steering wheels, one of said transmission gears being shiftable to reverse the action of said transmission gears relative to said steering wheels, and a lever at the upper end of said steering column by which the shiftable gear of said transmission gears may be shifted and said power plant controlled.

5. The combination with a steering gear mechanism and column having a steering wheel, of means reciprocable of said steering column for reversing the steering action of the steering gear mechanism, and a portion of said means being rotatable for power control purposes.

6. The combination called for in claim 5, wherein said means includes a rod with a lever on the upper end thereof.

7. In a steering column assembly, a compound steering gear, an intermediate gear meshing with said compound gear, a wheel equipped hollow steering shaft, a slidable gear on said shaft, adapted to mesh with either the compound gear or the intermediate gear or both, and means extending through said hollow shaft adapted for sliding said slidable gear.

8. A steering column assembly as called for in claim 7, wherein said means includes a rod articulated with the sliding gear, and a lever adapted for shifting said rod.

9. A steering column assembly including gears by which a vehicle may be steered in a desired direction, one of said gears being shiftable to effect reverse steering, a rod adapted for shifting the gear, and a lever swingable in a vertical plane for operating said rod.

10. A steering column assembly as called for in claim 9, wherein said lever is pivoted relative to said column and when coaxial of said rod is adapted to hold said gear in a neutral position preventing steering.

11. A steering column assembly including gears by which a vehicle may be steered in a desired direction, one of said gears being shiftable to effect reverse steering, and a rod adapted by reciprocation to shift said gear and by rotation adapted to control a source of power.

12. A steering column assembly as called for in claim 11, and means associated with said rod adapted to hold said rod in a shifted position.

In testimony whereof I affix my signature.

SIDNEY B. WINN.